Mar. 13, 1923.
J. F. FERRIOT
APPARATUS FOR MEASURING LIQUIDS
Filed June 5, 1922
1,448,266
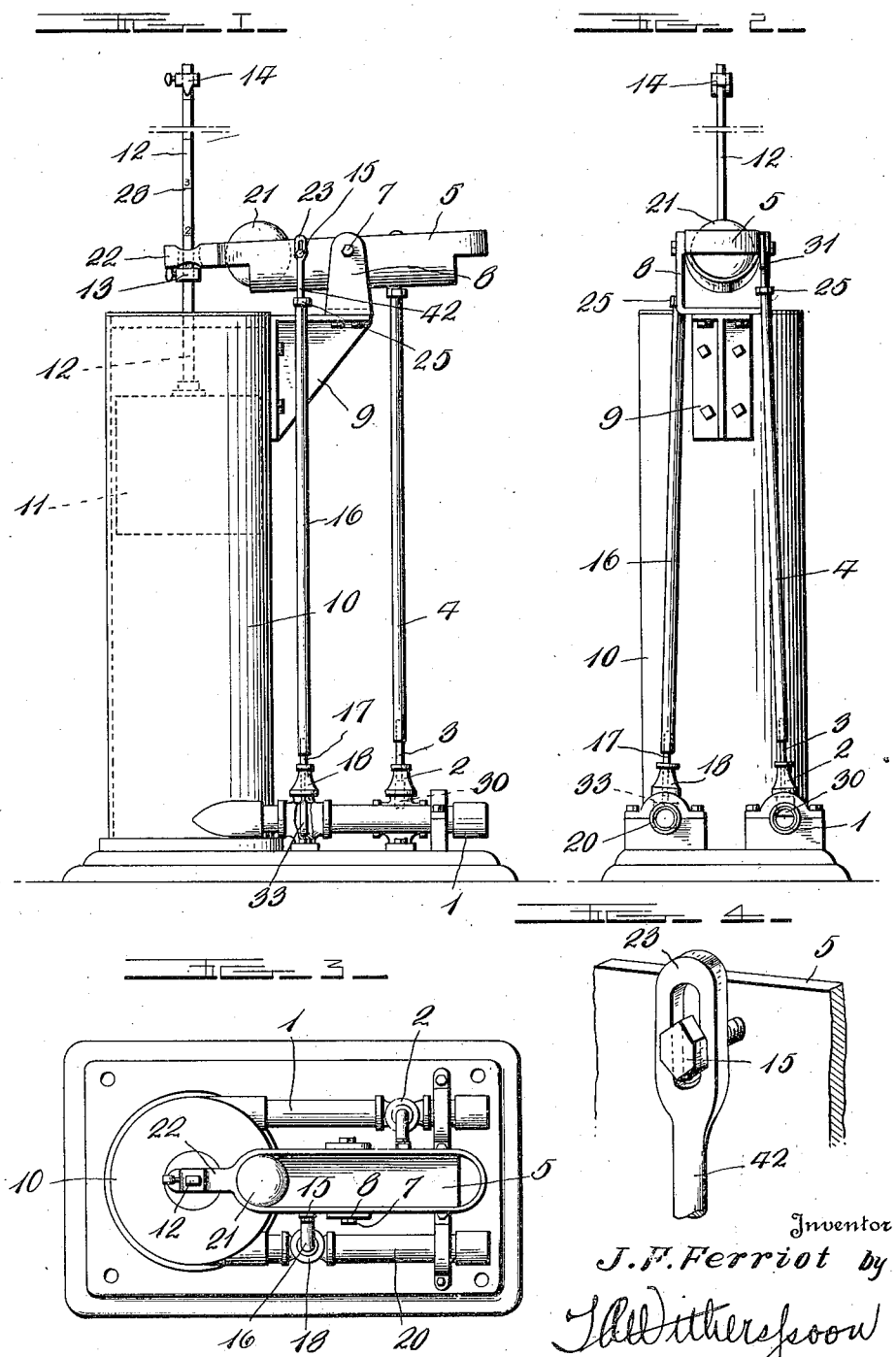
Inventor
J. F. Ferriot by
T. W. Witherspoon
Attorney Patented Mar. 13, 1923.

1,448,266

UNITED STATES PATENT OFFICE.

JOHN F. FERRIOT, OF RESERVE, LOUISIANA.

APPARATUS FOR MEASURING LIQUIDS.

Application filed June 5, 1922. Serial No. 566,085.

*To all whom it may concern:*

Be it known that I, JOHN F. FERRIOT, a citizen of the United States, residing at Reserve, in the parish of St. John the Baptist and State of Louisiana, have invented certain new and useful Improvements in Apparatus for Measuring Liquids; and I do hereby declare the following to be a full, clear, and exact description of the invention, such as will enable others skilled in the art to which it appertains to make and use the same.

This invention relates to apparatus for measuring liquids in general, but especially adapted for automatically measuring the water which is used in sugar refineries for the washing of sugar and has for its object to provide a means which will be more simple in construction, more certain in action, and less costly to produce than those which have been heretofore proposed.

With these and other objects in view, the invention consists in the novel details of construction and combinations of parts, all as will be more fully hereinafter disclosed and particularly pointed out in the claims.

Referring to the accompanying drawings forming a part of this specification, in which like numerals designate like parts in all the views:

Figure 1 is a side elevational view of an apparatus made in accordance with this invention;

Figure 2 is an end elevational view of the parts shown in Figure 1;

Figure 3 is a top plan view of the parts shown in Figure 2; and

Figure 4 is a detail view showing the slotted connection between the valve controlling trough and the inlet and outlet valves.

1 indicates any suitable liquid supply pipe provided with a vertically movable valve 30, whose stem 3 passes through the stuffing box 2 and is connected by the rod 4 to the member 31 which is pivoted as at 6 to the trough 5, pivoted as at 7 to the bracket 8 mounted on the support 9 rigid with the measuring tank 10 provided with the float 11 having the stem 12 carrying the adjustable stops 13 and 14, as shown. Also connected to said trough 5 as at 15 is the member 23 joined to the rod 16 joined to the valve stem 17 passing through the stuffing box 18 and controlling the valve 33 associated with the liquid outlet pipe 20.

The pivoted trough 5, also carries the ball weight 21, and has an extension 22 through which the float stem 12 passes. The upper ends of each of the connecting rods 4 and 16 are hollow to receive the lower reduced ends 42 of each of the slotted members 23 and 31. Adjustable locking means 25 are provided by which when the lengths of the said connections 4 and 16 are once properly adjusted said ends 42 of the members 23 and 31 are firmly locked in place.

The operation of this improved liquid measurer is as follows: The stops 13 and 14 are so set on the scale 28 of the stem 12 as to control the amount of liquid to be automatically measured; the float 11 is lowered in the tank 10, and the valve stem 3 is raised to open its valve 30, and admit the liquid through the pipe 1.

Liquid being thus admitted to the tank 10, the float 11 rises until its stop 13 strikes the extension 22 and lifts the same about the pivot 7 as a center, thus causing the ball 21 to roll to the other end of the trough 5 and still further tilt said trough. The slots in the members 23 and 31 enable the trough 5 to be tilted to a sufficient degree to start the ball 21 to rolling without disturbing either of the valve stems 3 or 17, and therefore the liquid will continue to enter the tank up to the instant the trough 5 is suddenly tilted by the said ball, which latter movement opens the outlet valve 33 associated with valve stem 17 and closes the inlet valve 30 associated with the valve stem 3. The result is after a predetermined quantity of liquid has entered said tank 10 the supply is automatically shut off and the measured quantity automatically permitted to flow from said tank through the pipe 20. As the liquid leaves the tank 10, the float 11 follows its level down toward the bottom, until the stop 14 strikes the extension 22 and again tilts the trough 5 sufficiently to cause the ball 21 to again assume the position shown in Figures 1 and 3. That is, stop 14 tilts the trough to a small extent without disturbing either the inlet valve 30 or the outlet valve 33, but sufficiently to cause the ball 21 to roll along the trough and suddenly open said inlet valve and close said outlet valve.

As the inlet and outlet valves are thus alternately opened and closed by the actions of the ball 21 and float 11, it is evident that the liquid will continue to flow in, be measured by tank 10 and flow out of the same as long as it is conducted to pipe 1. The apparatus is therefore of general use wherever a continuous supply of liquid in measured quantities is desired. This particular device finds a convenient application in sugar refineries, for example, where it is desired to automatically measure the amount of water to be used in the washing of sugar.

It is also evident that the adjustment of the stop 14 determines the amount or size of the measured quantity for it causes the closure of the outlet valve and the opening of the inlet valve. The stop 13 is adjusted mainly to correct errors in measurements.

It is obvious that those skilled in the art may vary the details of construction as well as the arrangement of parts, without departing from the spirit of the invention, and therefore I do not wish to be limited to the above disclosure except as may be required by the claims.

What I claim is:

1. In a device for measuring liquids, the combination of a tank; a pipe providing an inlet for said tank; a pipe providing an outlet for said tank; a valve controlling the flow of liquid through said inlet; a valve controlling the flow of liquid through said outlet; a vertically movable float in said tank provided with a graduated stem; a pair of adjustable stops carried by said stem; a trough provided with an extension disposed between said stops; means carried by said tank providing a pivot for said trough between its ends; a weight adapted to roll backwards and forwards in said trough; a slotted connection between said inlet valve and said trough located on one side of said pivot; a slotted connection between said outlet valve and said trough located on the other side of said pivot; and adjustable means for controlling the lengths of said slotted connections, substantially as described.

2. In a device for measuring liquids, the combination of a tank; a pipe providing an inlet for said tank; a pipe providing an outlet from said tank; a valve controlling the flow of liquid through said inlet; a valve controlling the flow of liquid through said outlet; a vertically movable float in said tank provided with a graduated stem; a pair of adjustable stops carried by said stem; a trough located outside said tank provided with an extension disposed between said stops; means comprising a bracket carried by said tank providing a pivot for said trough between its ends; a weight adapted to roll backwards and forwards in said trough; a slotted connection between said inlet valve and said trough located on one side of said pivot; a slotted connection between said outlet valve and said trough located on the other side of said pivot; and adjustable means for controlling the lengths of said slotted connections, substantially as described.

3. In a device for measuring liquids, the combination of a tank; a pipe providing an inlet for said tank; a pipe providing an outlet from said tank; a valve controlling the flow of liquid through said inlet; a valve controlling the flow of liquid through said outlet; a vertically movable float in said tank provided with a graduated stem; a pair of adjustable stops carried by said stem; a trough provided with an extension disposed between said stops; means carried by said tank providing a pivot for said trough between its ends; a weight adapted to roll backwards and forwards in said trough; a slotted connection comprising a valve stem and a rod to which said stem is joined between said inlet valve and said trough, said slotted connection being located on one side of said pivot; a slotted connection comprising a valve stem and a rod to which said stem is joined, between said outlet valve and said trough, said slotted connection being located on the other side of said pivot; and adjustable means for controlling the lengths of said slotted connections, substantially as described.

In testimony whereof I affix my signature.

JOHN F. FERRIOT.